2,815,323
Patented Dec. 3, 1957

2,815,323

TREATMENT OF DRILLING FLUIDS

Ralph P. Schneider, Bartlesville, Okla., assignor to Phillips Petroleum Company, a corporation of Delaware No Drawing. Application June 22, 1956,
Serial No. 593,019

27 Claims. (Cl. 252—8.5)

This invention relates to drilling fluids such as are employed in the drilling of oil and gas wells. In particular, it relates to drilling fluids containing starch or the like for improving the colloidal properties of the fluids, and to a method for treating such fluids to inhibit the degradation of the starch by microbiological or enzymatical constituents normally present in the drilling fluids.

In the art of drilling oil and gas wells, especially by the rotary method, it is necessary to use a drilling fluid or mud, as is well understood in the art. The drilling fluid lubricates the drill string, takes the cuttings to the surface of the well and forms a filter cake on the wall of the well to prevent the loss of any substantial amount of water from the drilling fluid to the natural formations penetrated.

A drilling fluid of the character described is often of the aqueous type wherein the external phase is water, in which is dispersed clay or other solid inorganic material. The drilling fluid may also contain formation solids, soluble salts, weighting materials, etc., and the aqueous phase may be fresh water or salt water.

One of the primary difficulties encountered in the drilling of the wells is the tendency of the drilling fluid to lose water to the formations penetrated. To this end, starchy or amylaceous material, such as gelatinized starch, is commonly incorporated in the aqueous drilling fluid to decrease the loss of water from the drilling fluid, in addition to aiding the formation of a filter cake on the wall of the well. The starch may be obtained from any suitable source such as corn, potato, soya bean, sago, tapioca, arrowroot, canna, Amioca (waxy maize), Yucca, etch., all of which are amylaceous colloids or starchy colloids. These starch additives are prepared by methods well known in the art and these methods need not be detailed here.

The efficiency of the starch additives to decrease the water loss of the drilling fluids to which they are added is seriously curtailed by the degradation of these additives in the presence of microbiological or enzymatical constituents commonly present in the drilling fluids. As degradation progresses during the course of drilling, the water loss properties of the drilling fluids increase, carbon dioxide is evolved and causes foam, and the drilling fluids have disagreeable odors. The degradation or fermentation of the starch additive can generally be prevented by maintaining in the drilling fluid a high salt concentration, about 15 percent, or a relatively high pH, about 12. However, these procedures do not always effectively inhibit the degradation and are often expensive. Commonly accepted bactericidal agents such as bichloride of mercury, copper sulfate and quaternary ammonia compounds have been found generally satisfactory in starch preservative drilling fluids.

Accordingly, an object of my invention is to provide a starch-containing drilling fluid, degradation of which is effectively inhibited. Another object is to provide a method for treating starch-containing drilling fluids so as to inhibit the degradation or fermentation of the starch additives present in the drilling fluid. A further object is to provide a method for treating a starch-containing drilling fluid so as to maintain the desired colloidal properties of the drilling fluid, for example, its low water loss. Further objects and advantages of my invention will become apparent, to those skilled in the art, from the following description and appended claims.

Broadly contemplated, in accordance with my invention, an aqueous system, such as drilling fluid, containing starch or like amylaceous material is treated with a compound capable of inhibiting the degradation or fermentation of the starch material. The compounds I have found useful in achieving the objects of my invention have a structural formula which may be represented diagrammatically as follows:

wherein A is a radical selected from the group consisting of alkyl and halogen substituted alkyl radicals, the total number of carbon atoms not exceeding 3; and B is a radical selected from the group consisting of hydrogen, hydroxy, amino and halogen substituted alkoxy and alkenoxy radicals, the total number of carbon atoms not exceeding 3; said A radical having at least one halogen substituent when said B radical is selected from said hydrogen, hydroxy and amino radicals.

The location of the halogen substituents on the alkyl radical (A) is not critical but I prefer to have them located at the 2 or alpha position, e. g., 2-chloropropionic acid. Moreover, the compounds having only one alkyl radical (A), which may have halogen substituents, are preferred because they are generally more soluble in water. The alkoxy and alkenoxy radicals can have other substituents besides halogen substituents, such as an acetoxy radical, e. g., chloroallylidene diacetate. These latter compounds are somewhat water insoluble and can be treated to make them more soluble in water, as more fully described hereinafter. The halogen substituents representatively include chlorine, bromine, iodine and fluorine.

Representative compounds within the scope of the above general formula and useful in the practice of my invention include: chloroacetic acid, iodoacetic acid, fluoracetic acid, dibromoacetic acid, trichloroacetic acid, 2-bromopropionic acid, 3-chloropropionic acid, 2,3-dichloropropionic acid, 4-chlorobutyric acid, chloroacetaldehyde, dibromoacetaldehyde, trichloroacetaldehyde, tribromoacetaldehyde, 2-dichloropropionaldehyde, 2,3-dibromopropionaldehyde, 2,3-dibromobutyraldehyde, 3,4-dichlorobutyraldehyde, 4-chlorobutyraldehyde, chloroacetamide, dichloroacetamide, tribromoacetamide, 2-chloropropionamide, 3-chloropropionamide, 2-dibromovaleramide, 4-chlorovaleramide, chloromethylacetate, chloromethylchloroacetate, 2-chloroethyl-propionate, 1-chloropropyl-butyrate, 1,3-dichloroisopropylacetate, 1-chlorovinylacetate, 2-chloroallyl-2-chloropropionate, 2-chloroallylidene diacetate, and the like.

One of the more efficient means for testing the progressive degradation or fermentation of a starch-containing drilling fluid is the water loss test which determines the ability of the drilling fluid to restrict the loss of water from the drilling fluid through the walls of the well. This determination is generally made in accordance with the American Petroleum Institute standard field procedure for testing drilling fluids, API Code 29. The water loss of the drilling fluid is determined initially and at the end of 14 days. If the water loss increases during this period, the degradation of starch in the drilling fluid due to the presence of microbiological or enzymatical constituents is indicated, and if this degradation continues despite the presence of a bactericide, the latter is of no value. Since the properties of a bactericide compound are sometimes highly dependent upon pH, it is commonly necessary to maintain the pH of the drilling fluid to be tested by incorporating therein a buffering agent, such as $Na_2HPO_4$.

To demonstrate the effectiveness of the above-described compounds to inhibit the degradation or fermentation of starch or like fermentable materials in drilling fluids, the following examples are presented in the nature of illustration of the practical value of my invention and are not to be construed as limiting my invention in any sense.

EXAMPLES

A typical drilling fluid was prepared by mixing 200 grams of an attapulgite clay with 2800 milliliters of water. After thorough mixing, 100 grams of sodium ortho phosphate ($Na_2HPO_4$) and 44 grams of "Impermix" (a prehydrolized starch commonly used in drilling fluids) were added. The drilling fluid was aged for five hours. Aliquot sample portions of the drilling fluid were each treated with various compounds according to the practice of my invention. The drilling fluid samples were each innoculated with 1 cc. of a soil suspension containing microbacteriological constituents ordinarily capable of causing degradation or fermentation of starch. The physical properties of the drilling fluid samples were measured according to API Code 29 at the beginning and end of a 14 day period, during which time the samples were kept at 98.6° F. The following is a tabulation of the results of this experiment:

Table I

| Inhibiting compound | Concentration (lb./bbl.) | pH Initial | pH After 14 Days | Water-Loss (ml.) Initial | Water-Loss (ml.) After 14 Days |
|---|---|---|---|---|---|
| None (Blank) | 0 | 8.2 | 7.2 | 13.0 | 34.0 |
| Chloroacetaldehyde | 0.1 | 8.0 | 7.7 | 12.0 | 15.0 |
| Do | 0.5 | 8.4 | 7.4 | 12.0 | 12.5 |
| Do | 1.0 | 8.2 | 6.4 | 12.0 | 12.5 |
| Trichloroacetaldehyde | 0.1 | 8.2 | 6.9 | 11.5 | 38.0 |
| Do | 0.5 | 8.2 | 7.2 | 13.0 | 20.0 |
| Do | 1.0 | 8.1 | 7.2 | 12.0 | 12.0 |
| Tribromoacetaldehyde | 1.0 | 7.3 | 6.5 | 13.0 | 12.0 |
| 1-chloroacetamide | 0.5 | 8.2 | 7.2 | 12.0 | 40.0 |
| Do | 1.0 | 8.4 | 7.5 | 12.0 | 15.0 |
| Chloroacetic acid | 1.0 | 7.4 | 7.1 | 12.0 | 21.0 |
| Iodoacetic acid | 0.1 | 8.4 | 7.6 | 12.0 | 43.0 |
| Do | 0.5 | 8.1 | 7.8 | 11.5 | 43.0 |
| Do | 1.0 | 7.5 | 7.5 | 13.0 | 14.0 |
| 1,3-dichloroisopropylacetate | 1.0 | 7.9 | 7.3 | 12.0 | 13.5 |
| 2-chloroallylidene diacetate | 0.1 | 8.4 | 7.2 | 12.0 | 32.0 |
| Do | 0.5 | 8.1 | 7.8 | 12.0 | 12.5 |
| Do | 1.0 | 8.1 | 7.6 | 12.0 | 13.0 |

From the above data it is apparent that the treatment of the starch-containing drilling fluid according to the practice of my invention inhibits the degradation or fermentation of the starch additives present in the drilling fluids. The starch is preserved effectively over long periods of time.

Those inhibiting compounds which are not generally soluble in water, or difficultly soluble, such as 2-chloroallylidene diacetate, can preliminarily be dispersed in organic solvents or organic-aqueous solvents, such as 50—50 volume percent aqueous isopropyl alcohol, and then added to the drilling fluid.

The amounts of the various inhibiting compounds to be employed according to the practice of my invention in order to inhibit degradation of starch-containing drilling fluid will depend somewhat upon the conditions encountered during drilling, as well as the amount of starchy material present. The amount of starch present will depend upon the susceptibility of a particular drilling fluid to starch treatment and the final properties desired in the mud, as is well known in the art. In general, a high order of effectiveness is obtained by treating the starch-containing drilling fluid with 0.05 to 5 pounds of inhibiting compound per barrel of drilling fluid (42 gallons). However, this result can be obtained by employing 0.1 to 1 pound of inhibiting compound per barrel of drilling fluid and I prefer to employ this more limited range. Although larger amounts of the drilling compound can be employed without harm, it is generally not necessary to treat with more than 5 pounds per barrel. A combination of several of the above-enumerated inhibiting compounds can be effectively employed and the particular compound or compounds to be employed, and the amounts thereof, can be readily determined by those skilled in the art by performing simple routine tests. The inhibiting compounds can be introduced into the drilling fluid as a solid in powder form, or in liquid form. Such inhibiting compounds can be introduced through a hopper and mixed with the drilling fluid in the same manner that other drilling fluid constituents are added. Alternatively, the inhibiting compounds may be introduced into the mud pit. It is generally advisable to begin treatment with a large initial amount of the treating compound and to introduce successive amounts during the course of the drilling as required. The particular inhibiting compounds employed and the amounts thereof will have no material effect on the ordinary characteristics of the drilling fluid, such as viscosity and gel strength, and, therefore, will not impair ordinary drilling operations.

Various modifications of my invention will become apparent, to those skilled in the art, without departing from the scope and spirit of my invention and it is to be understood that the foregoing discussion and examples are merely illustrative of a practical method for practicing my invention and do not unduly limit the same.

I claim:

1. A drilling fluid comprising an aqueous suspension of inorganic solids, amylaceous-colloid material, and a minor amount of a compound sufficient to inhibit the degradation of said material, said compound having a general formula represented diagrammatically as follows:

wherein A is a radical selected from the group consisting of alkyl and halogen substituted alkyl radicals, the total number of carbon atoms not exceeding 3; and B is a radical selected from the group consisting of hydrogen, hydroxy, amino and halogen substituted alkoxy and alkenoxy radicals, the total number of carbon atoms not exceeding 3; said A radical having at least one halogen substituent when said B radical is selected from said hydrogen, hydroxy and amino radicals.

2. A drilling fluid according to claim 1 wherein said A radical is an alkyl radical.

3. A drilling fluid according to claim 1 wherein said A radical is a halogen substituted alkyl radical.

4. A drilling fluid according to claim 1 wherein said B radical is a halogen substituted alkoxy radical.

5. A drilling fluid according to claim 1 wherein said B radical is a halogen substituted alkenoxy radical.

6. A drilling fluid according to claim 1 wherein said A radical is a halogen substituted alkyl radical and said B radical is a hydrogen radical.

7. A drilling fluid according to claim 1 wherein said A radical is a halogen substituted alkyl radical and said B radical is a hydroxy radical.

8. A drilling fluid according to claim 1 wherein said A radical is a halogen substituted alkyl radical and said B radical is an amino radical.

9. A drilling fluid according to claim 3 wherein the halogen is located at the 2 or alpha position.

10. A drilling fluid comprising an aqueous suspension of clayey material, starch, and a compound to inhibit the degradation of said starch, said compound having a general formula represented diagrammatically as follows:

wherein A is a radical selected from the group consisting of alkyl and halogen substituted alkyl radicals, the total number of carbon atoms not exceeding 3; and B is a radical selected from the group consisting of hydrogen, hydroxy, amino and halogen substituted alkoxy and alkenoxy radicals, the total number of carbon atoms not exceeding 3, said A radical having at least one halogen substituent when said B radical is selected from said hydrogen, hydroxy and amino radicals.

11. A drilling fluid according to claim 10 wherein the amount of said compound is in the range between 0.05 and 5 pounds per barrel of drilling fluid.

12. A drilling fluid according to claim 10 wherein the amount of said compound is in the range between 0.1 and 1 pound per barrel of drilling fluid.

13. A drilling fluid according to claim 10 wherein said compound is chloroacetaldehyde.

14. A drilling fluid according to claim 10 wherein said compound is chloroacetamide.

15. A drilling fluid according to claim 10 wherein said compound is chloroacetic acid.

16. A drilling fluid according to claim 10 wherein said compound is 1,3-dichloroisopropylacetate.

17. A drilling fluid according to claim 10 wherein said compound is 2-chloroallylidene diacetate.

18. A drilling fluid according to claim 17 wherein said 2-chloroallylidene diacetate is preliminarily dispersed in aqueous isopropyl alcohol, and the resulting dispersion then added to the drilling fluid.

19. In the art of drilling wells with well drilling fluids wherein there is circulated in the well a drilling fluid comprising an aqueous suspension of inorganic solids and amylaceous-colloid material, the improvement comprising treating the drilling fluid with a minor amount of a compound sufficient to inhibit the degradation of said material, said compound having a general formula represented diagrammatically as follows:

wherein A is a radical selected from the group consisting of alkyl and halogen substituted alkyl radicals, the total number of carbon atoms not exceeding 3; and B is a radical selected from the group consisting of hydrogen, hydroxy, amino and halogen substituted alkoxy and alkenoxy radicals, the total number of carbon atoms not exceeding 3; said A radical having at least one halogen substituent when said B radical is selected from said hydrogen, hydroxy and amino radicals.

20. In the art of drilling wells with well drilling tools wherein there is circulated in the well a drilling fluid comprising an aqueous suspension of clayey material and starch, the improvement comprising inhibiting the degradation of said starch by treating said drilling fluid with a compound having a general formula represented diagrammatically as follows:

wherein A is a radical selected from the group consisting of alkyl and halogen substituted alkyl radicals, the total number of carbon atoms not exceeding 3; and B is a radical selected from the group consisting of hydrogen, hydroxy, amino and halogen substituted alkoxy and alkenoxy radicals, the total number of carbon atoms not exceeding 3; said A radical having at least one halogen substituent when said B radical is selected from said hydrogen, hydroxy and amino radicals.

21. In the art of drilling wells according to claim 20 wherein said compound is present in an amount in the range between 0.05 and 5 pounds per barrel of drilling fluid.

22. In the art of drilling wells according to claim 20 wherein said compound is present in an amount in the range between 0.1 and 1 pound per barrel of drilling fluid.

23. In the art of drilling wells according to claim 21 wherein said compound is chloroacetic acid.

24. In the art of drilling wells according to claim 21 wherein said compound is chloroacetamide.

25. In the art of drilling wells according to claim 21 wherein said compound is chloroacetaldehyde.

26. In the art of drilling wells according to claim 21 wherein said compound is 1,3-dichloroisopropylacetate.

27. In the art of drilling wells according to claim 21 wherein said compound is 2-chloroallylidene diacetate.

References Cited in the file of this patent

UNITED STATES PATENTS

| | | |
|---|---|---|
| 1,940,592 | Henderson | Dec. 19, 1933 |
| 2,271,695 | Jones | Feb. 3, 1942 |
| 2,360,327 | Bailey et al. | Oct. 17, 1944 |
| 2,497,579 | Bried | Feb. 14, 1950 |